United States Patent [19]
Devenyi

[11] Patent Number: 5,857,383
[45] Date of Patent: Jan. 12, 1999

[54] HEAVY DUTY ROLLER NUT ASSEMBLY FOR POWER DRIVE APPLICATIONS

[75] Inventor: Gabor Devenyi, Penetang, Canada

[73] Assignee: Raytheon Company, Lexington, Mass.

[21] Appl. No.: 768,512

[22] Filed: Dec. 18, 1996

[51] Int. Cl.[6] ................................................. F16H 25/22
[52] U.S. Cl. ........................ 74/424.8 R; 74/441; 74/459
[58] Field of Search .............................. 74/459, 424.8 R, 74/441, 89.15, 89

[56] References Cited

U.S. PATENT DOCUMENTS

| | | | |
|---|---|---|---|
| 2,482,082 | 9/1949 | Wahlberg | 74/459 |
| 2,616,302 | 11/1952 | Wahlmark | 74/459 |
| 3,614,900 | 10/1971 | Wahlmark | 74/459 |
| 4,856,356 | 8/1989 | Gartner | 74/424.8 R X |
| 5,533,417 | 7/1996 | Devenyi | 74/424.8 R |

FOREIGN PATENT DOCUMENTS

| | | | |
|---|---|---|---|
| 3106-221 | 10/1982 | Germany | 74/459 |
| 3225-496-A | 1/1984 | Germany | 74/459 |

*Primary Examiner*—Richard M. Lorence
*Assistant Examiner*—Ankur Parekh
*Attorney, Agent, or Firm*—W. C. Schubert; G. H. Lenzen, Jr.

[57] ABSTRACT

A linear displacement device (1) is provided with a lead screw (24) having a helical threaded portion (74) and a roller nut assembly (10). The roller nut assembly (10) includes a housing (50) having openings (52, 54) for receiving the lead screw (24) therethrough. A pair of bearings (56, 58) are supported within said housing (50). The bearings (56, 58) each have an inner race (60), an outer race (62) and a plurality of balls (64) disposed between the inner and outer races (60, 62). A threaded member (66) is supported radially inward of said inner race (60). Threaded member (66) includes a plurality of concentric grooves (72) for engaging the flank (68, 72) of a helical threaded portion (74) of the lead screw (24) and a crest contacting portion (70) for engaging a crest (76) of the helical threaded portion (74) of the lead screw (24). A spring member (68) is provided for preloading the bearing (56, 58).

18 Claims, 3 Drawing Sheets

HEAVY DUTY ROLLER NUT ASSEMBLY FOR POWER DRIVE APPLICATIONS

BACKGROUND OF THE INVENTION

1. Field of the Invention

The present invention relates to a linear displacement device and, more specifically, to a roller nut assembly for use with a lead screw of a linear displacement device.

2. Discussion

Linear displacement devices are generally known in the art. Linear displacement devices are used for the rapid, smooth and precise adjustment of linear mechanisms, such as zoom lenses, micrometers, and stepper motor stages, by automatic screw-turning or nut-turning means.

The standard linear displacement device utilizes a lead screw and a standard nut for converting the rotary motion of the lead screw element to relative linear displacement of the nut. The lead screws are generally driven by a stepper motor which causes the lead screw to rotate in increments which causes a corresponding incremental linear movement of the nut.

For proper operation of the conventional lead screw and nut assembly, the nut must be preloaded and periodically reset to produce a repeatable performance. The preload between the nut and the spindle has to be extremely high in order for the linear displacement device to be play-free. The extremely high preload which is required greatly contributes to the amount of friction between the mating surfaces between the lead screw and nut in the linear displacement device. In a typical linear displacement device, thirty to forty percent of the motor torque is used just to overcome the friction between the static nut and the rotating lead screw.

Additionally, if the linear displacement device is used in a vertical orientation, the lubricant between the lead screw and the standard nut will migrate and leave dry the preloaded mating surfaces of the lead screw and nut, thus increasing friction even further, and contributing to the failure of these units.

Accordingly, it is desirable in the art of linear displacement devices to provide a linear displacement device which greatly decreases the amount of friction between the rotating lead screw and the linear displacing nut.

SUMMARY OF THE INVENTION

It is an object of the present invention to provide a linear displacement device which is simple in structure, inexpensive to manufacture, easy to mass produce, durable in use and compact.

These and other objects of the present invention are achieved by providing a linear displacement device, comprising:

a lead screw having a helical thread; and a roller nut assembly including:

a housing first and second bearings each having an inner race, an outer race and a plurality of balls disposed between said inner and outer races, said inner race supporting a threaded member radially inward thereof, said threaded member having first and second conical surfaces, one of said first and second conical surfaces having at least one groove, said first and second bearings being supported diagonally within said housing; and spring means for preloading said first and second bearings;

wherein the at least one groove of the threaded members of each of said first and second bearings engage said helical thread of said lead screw.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 6 is an enlarged view of a typical lead screw which is utilized with the roller nut assembly of the present invention.

DETAILED DESCRIPTION OF THE PREFERRED EMBODIMENTS

Figure 1:
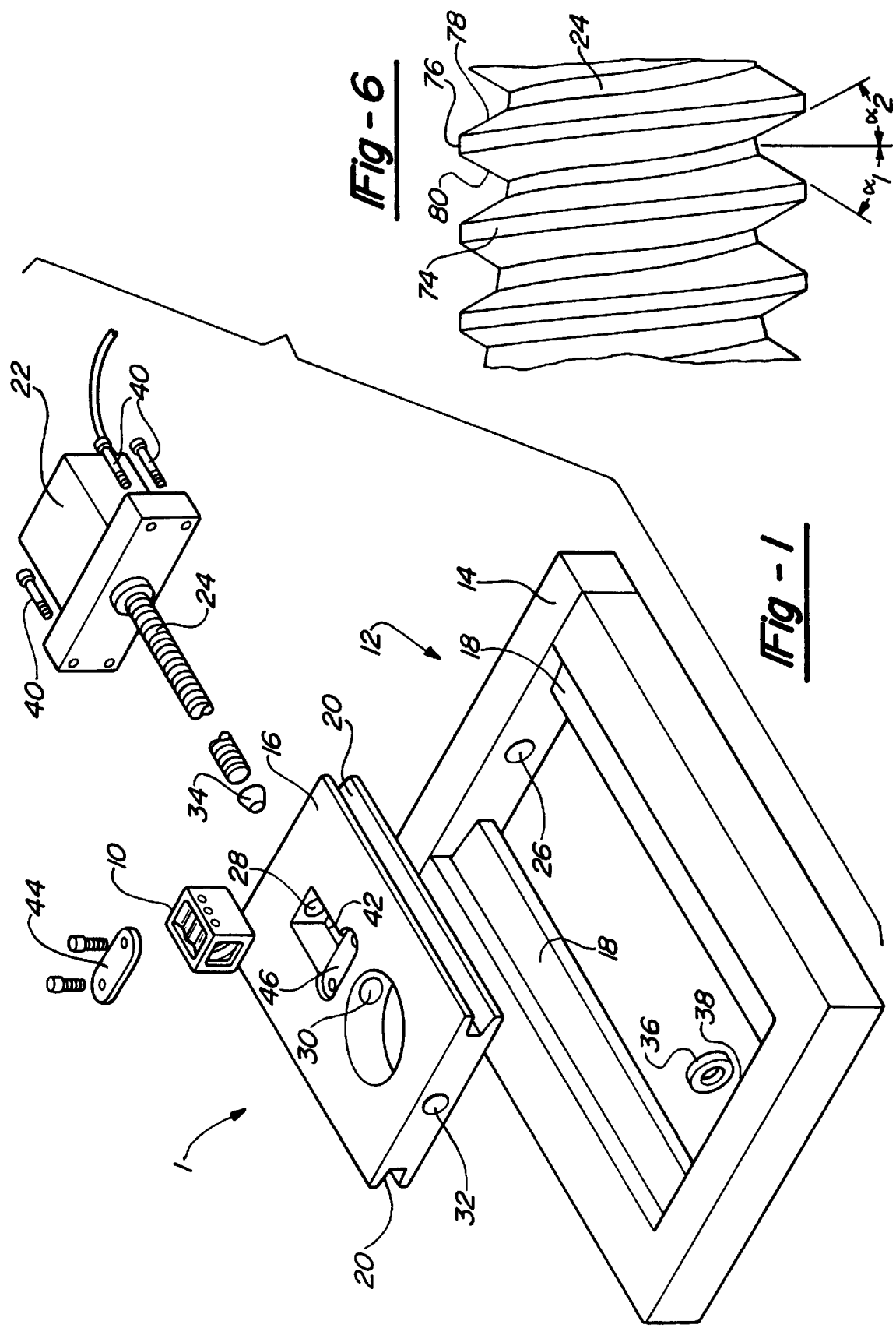
FIG. 1 is a perspective view of the components of a stepper motor linear displacement stage which incorporates the roller nut assembly according to the principles of the present invention.

The present invention relates to a linear displacement device 1 utilizing a roller nut assembly 10. The linear displacement device 1 according to an exemplary embodiment, is incorporated into a stepper motor stage 12.

The stepper motor stage 12 includes a base portion 14 and a slide stage 16. The base portion 14 includes a pair of V-shaped side members 18 which mate with corresponding V-shaped grooves 20 disposed on opposite sides of slide stage 16.

A stepper motor 22 is mounted to the base 14 of the stepper motor stage 12. The stepper motor 22 is attached to a lead screw 24 for driving the lead screw 24 in a rotary fashion. The lead screw 24 extends through a hole 26 in the base 14 and through a hole 28 in an end portion of slide stage 16. The lead screw also passes through the roller nut assembly 10 and holes 30, 32 of slide stage 16. An end portion 34 of lead screw 24 is supported by a bearing 36 which is supported in a bore 38 in the base 14 of the stepper motor stage 12. The stepper motor 22 is secured to the base 14 by a plurality of screws 40.

The slide stage 16 is provided with a roller nut chamber 42 for receiving the roller nut assembly 10. The roller nut assembly 10 is secured in the roller nut chamber 42 by a mounting bracket 44. The slide stage 16 is provided with a mounting pocket 46 for receiving the mounting bracket 44 such that the top surface of the mounting bracket 44 is flush with the top surface of the slide stage 16.

In operation, the stepper motor 22 is driven so as to drive the lead screw 24 in a rotary fashion. As the lead screw 24 rotates, the roller nut assembly 10, which engages the lead screw 24 in a manner which will be described later, is driven in a linear fashion. Because the roller nut assembly 10 is secured to the slide stage 16, the roller nut assembly 10 drives the slide stage 16 in a linear fashion relative to the base 14 of the stepper motor stage 12.

Figure 2:
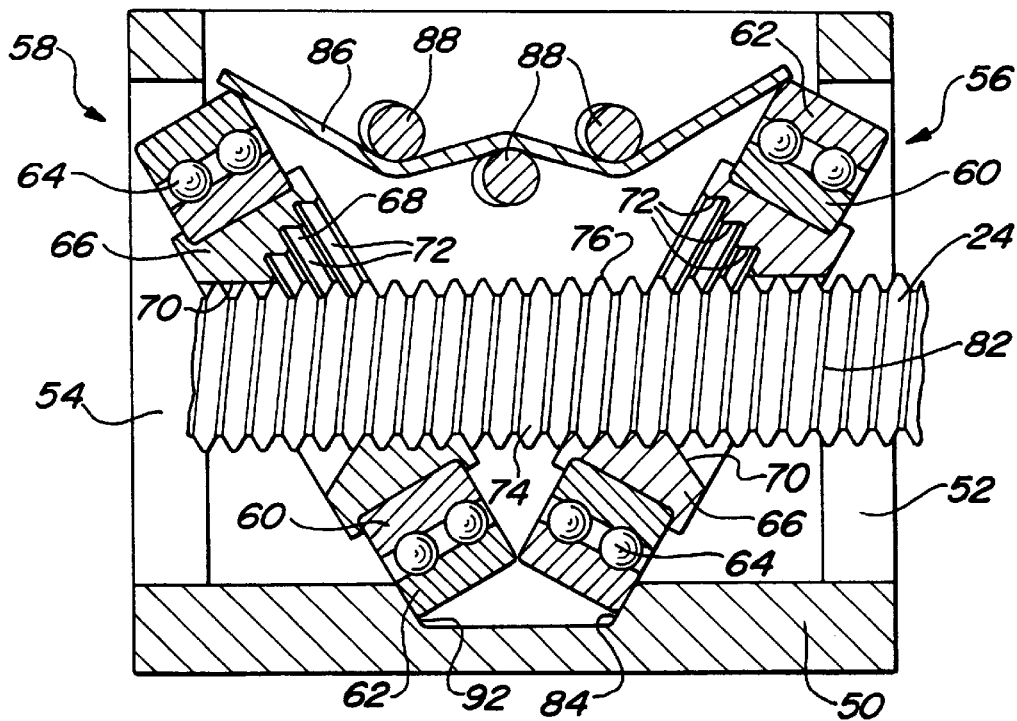
FIG. 2 is a cross-sectional view of the roller nut assembly according to the principles of the present invention.
Figure 3:
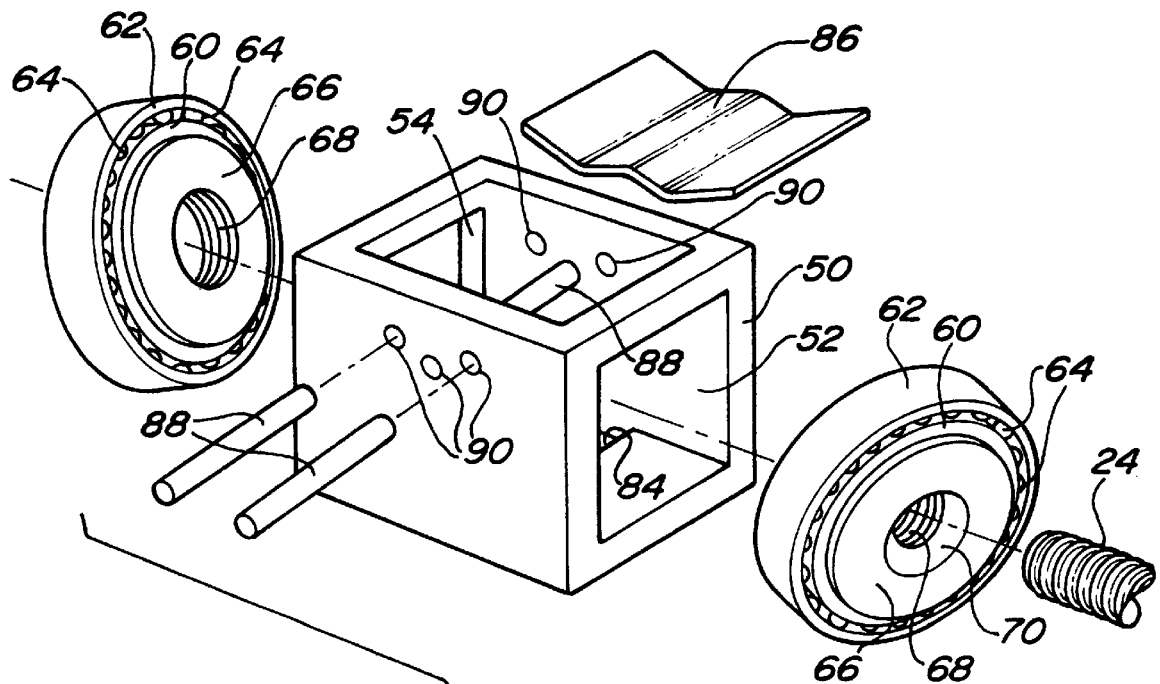
FIG. 3 is an exploded perspective view of the components of the roller nut assembly shown in FIG. 2.

With reference to FIGS. 2 and 3, a first embodiment of the roller nut assembly 10 according to the present invention will now be described in greater detail. The roller nut assembly 10 includes a housing 50 having two open ends 52, 54 for receiving the lead screw 24 therethrough. It should be understood that the shape and configuration of the housing 50 is merely exemplary and may be varied in many ways.

The roller nut assembly 10 includes first and second bearings 56, 58, respectively. The first and second bearings 56, 58 are angularly disposed within the housing 50. Each of the first and second bearings 56, 58 include an inner race 60 and an outer race 62. A plurality of balls 64 are provided between the inner and outer races 60, 62.

The inner race 60 of each of the first and second bearings 56, 58 support a threaded member 66 radially inward thereof. Threaded member 66 is provided with first and second conical surfaces 68, 70, respectively. First conical surface 68 is provided with a plurality of concentric grooves 72 which are designed to mate with a helical thread 74 of lead screw 24.

The second conical surface 70 of each of the threaded members 66 engage the crest 76 of the helical thread 74 of lead screw 24, as best seen in FIG. 2.

The first and second bearings 56, 58 are angularly supported within the housing 50 of the roller nut assembly 10 so that the concentric grooves 72 of the threaded member 66 are substantially parallel with leading and following flank surfaces 78, 80 of the helical thread 74. With reference FIG. 6, the angles ($\alpha$1 and $\alpha$2) of the leading and the following flanks 78, 80, respectively, are shown. Thus, the first bearing 56 is preferably disposed such that grooves 72 of the threaded member 66 are at approximately an angle $\alpha$1 relative to the lead screw 24. Likewise, the second bearing 58, which has grooves 72 on threaded member 66 engaging the following flank 80 of helical thread 74, is disposed such that concentric grooves are at an angle $\alpha$2 relative to the lead screw 24. In other words, the first and second bearings 56, 58 are disposed to accommodate the thread 74 of the lead screw 24 by being tilted in accordance with the tracking angle of the thread 74 of the lead screw 24 as well as the helix angle thereof. As used herein, the tracking angle of the thread 74 of the lead screw 24 is the angle of each of the leading and following flanks 78, 80 with respect to the axis of rotation 82 of lead screw 24. The helix angle is that angle that the thread 74 is transverse to the axis of the rotation 82 of lead screw 24.

The first bearing 56 is supported within the housing 50 by the lead screw 24, a retaining surface 84 and a leaf spring 86 which is provided between the bearings 56, 58 for preloading each of the bearings 56, 58. The leaf spring 86 is held in place by spring retaining pins 88 which are received in a plurality of support holes 90 of housing 50.

Second bearing 58 is similarly supported by a second retaining surface 92, lead screw 24, and the leaf spring 86. The leaf spring 86 biases the first and second bearings 56, 58 in opposing directions so that the bearings 56, 58 are preloaded and self-align themselves with the thread angle of the lead screw. The retaining surfaces 84, 92 and retaining pins 88 are merely an exemplary means of supporting the bearings 56, 58 and leaf spring 86. It should be understood that the specific method of supporting the bearings 56, 58 and leaf spring 86 within the housing 50 can be varied in many ways.

Figure 4:
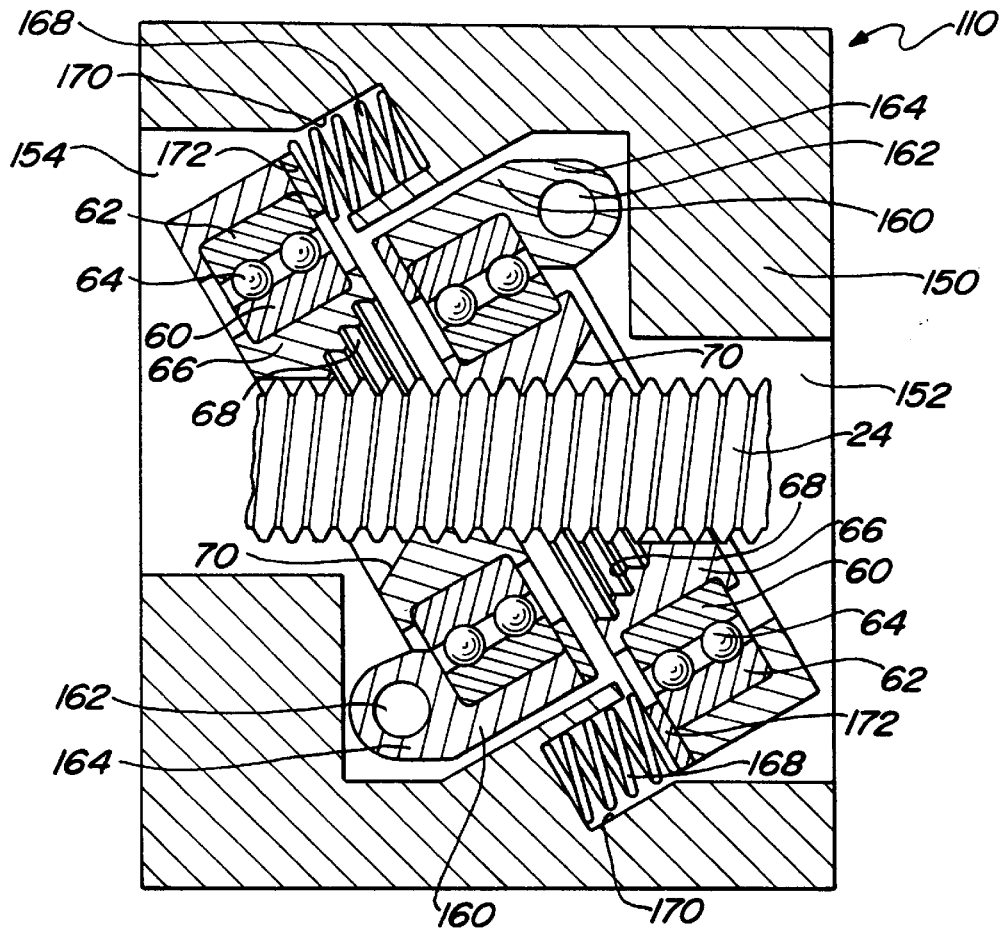
FIG. 4 is a cross-sectional view of the roller nut assembly according to a second embodiment of the present invention.
Figure 5:
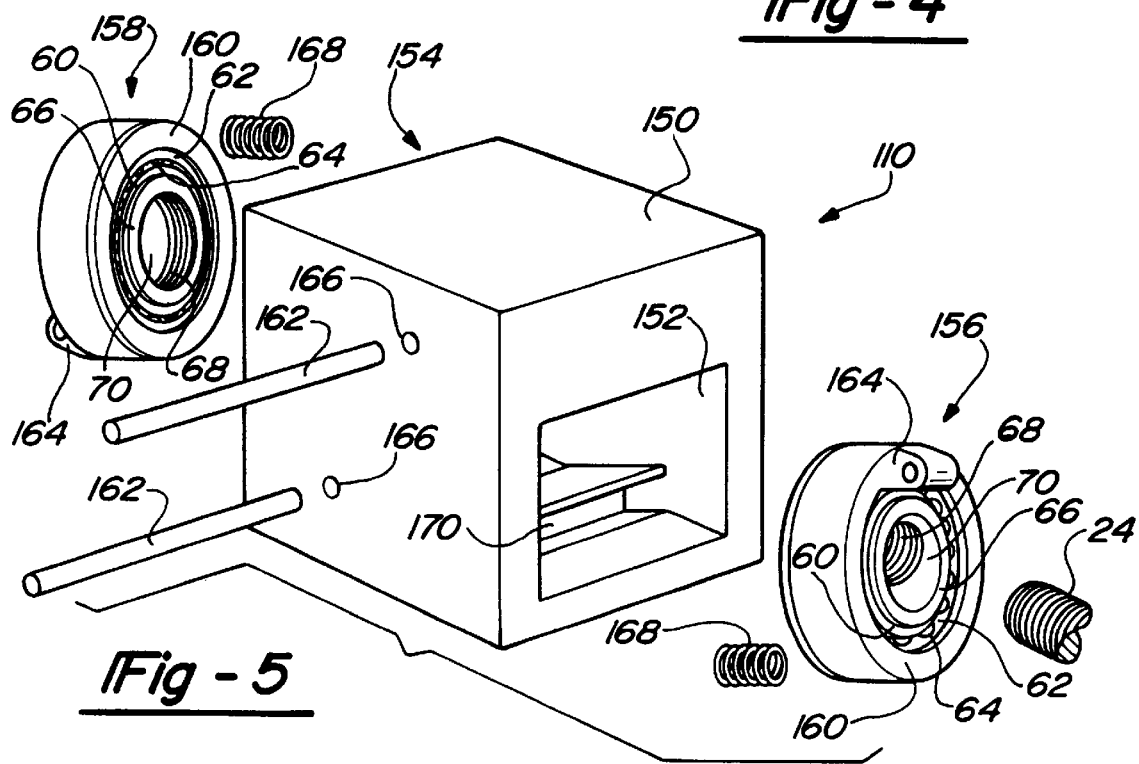
FIG. 5 is an exploded perspective view of the components of the roller nut assembly shown in FIG. 4.

With reference to FIGS. 4 and 5, a second embodiment of the roller nut assembly 110 according to the present invention will now be described in greater detail. The roller nut assembly 110 includes a housing 150 having two open ends 152, 154 for receiving the lead screw 24 therethrough. It should be understood that the shape and configuration of the housing 150 is merely exemplary and may be varied in many ways.

The roller nut assembly 110 includes first and second bearings 156, 158, respectively. The first and second bearings 156, 158 are angularly disposed within the housing 150. Each of the first and second bearings 156, 158 include an inner race 160 and an outer race 162. A plurality of balls 164 are provided between the inner and outer races 160, 162.

The inner race 160 of each of the first and second bearings 156, 158 support a threaded member 66 radially inward thereof. Threaded member 66 is provided with first and second conical surfaces 68, 70, respectively. First conical surface 68 is provided with a plurality of concentric grooves 72 which are designed to mate with a helical thread 74 of lead screw 24.

The second conical surface 70 of each of the threaded members 66 engage the crest 76 of the helical thread 74 of lead through 24, as best seen in FIG. 2.

The first and second bearing members 156, 158 are supported within the housing 150 by the lead screw 24 and by a radially outwardly disposed mounting member 160 which is mounted to housing 150 by a retaining pin 162 received in pin receiving portion 164 of mounting member 160. Retaining pin 162 is received in mounting holes 166 in housing 150. Each of the first and second bearing members 156, 158 are provided with a preload by coil springs 168 which are received in spring seat portions 170 of housing 150 and press against retaining ring 172.

The first and second bearings 156, 158 are angularly supported within the housing 150 of the roller nut assembly 110 in the same manner as the bearing members 56, 58 as discussed above with reference to FIGS. 2 and 3.

In its simplest forms, the bearings in the roller nut 10, 110 according to the present invention can be provided with a conical surface 68 equipped with concentric grooves 72 which engage the thread 74 on the lead screw 24. The bearings are tilted to follow the lead angle and the profile angle of the thread, producing a linear displacement equal to the thread pitch. This general configuration can be modified to produce a larger or smaller displacement than the lead screw pitch. Extremely small linear displacement (i.e. high reduction ratio) can be achieved by using a small differential between the lead screw thread and the nut thread. For example, the roller nut is made with the same (internal) thread direction (i.e. right hand) but a slightly different pitch. As the roller nut is driven by the lead screw, the total linear displacement will be equal to the pitch difference, i.e. lead screw equal 1 mm pitch, roller nut equal 0.9 mm pitch, the linear displacement will be 0.1 mm in one revolution. As for larger diameter displacement, if the thread in the roller nut is a left-hand thread (1 mm pitch) and the lead screw is a right-hand thread (1 mm pitch), the total displacement will be 2 mm.

The present roller nut assemblies 10, 110 of the present invention are advantageous in that the point of engagement of the lead screw 24 and the grooved or threaded elements of the roller nut assemblies 10, 110 is only in a rolling contact. Therefore, the wear between the lead screw and the engaging elements is minimal. Further, friction is higher at the contact between the engaging elements and the helical thread, than between the inner race and the outer race of the bearings. Therefore, the efficiency of the linear displacement device according to the present invention is greatly increased as compared to conventional linear displacement devices.

The lead screw 24 drives the threaded member 66 while the threaded members track the thread profile of the lead screw 24 which in turn moves the housing 50 in the linear direction. The bearings 56, 58; 156, 158 are loaded against the thread 74 of the lead screw 24 and against each other by springs 86; 168. All of the preload forces and additional axial loads are confined to the races of the bearings 56, 58; 156, 158.

The preload forces on the bearings remove the play between the roller nut assembly 10; 110 and the lead screw 24. Further, lubrication of the roller nut assembly 10, 110 can be confined to the ball bearings only and, depending upon the speed for which the assembly is utilized, may not be necessary at all. Because of the reduced friction obtained by the bearings 56, 58; 156, 158, the use of heavy payloads can be applied to the roller nut assembly without large efficiency losses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linear displacement device, comprising:
   a lead screw having a helical thread; and
   a roller nut assembly including:
      a housing
      first and second bearings each having an inner race, an outer race and a plurality of balls disposed between said inner and outer races, said inner race supporting a threaded member radially inward thereof, said threaded member having first and second conical surfaces, one of said first and second conical surfaces having a plurality of concentric grooves formed therein, said first and second bearings being supported diagonally within said housing; and
      spring means for preloading said first and second bearings;
      wherein the at least one groove of the threaded members of each of said first and second bearings engage said helical thread of said lead screw.

2. The linear displacement device according to claim 1, wherein the other of said first and second conical surfaces of said threaded member engage a crest of said helical thread of said lead screw.

3. The linear displacement device according to claim 1, wherein said spring means includes a leaf spring disposed between said first and second bearings.

4. The linear displacement device according to claim 3, wherein said leaf spring is retained between said first and second bearings by a plurality of pins mounted to said housing.

5. The linear displacement device according to claim 1, wherein said housing is provided with retaining surfaces for supporting said first and second bearings in said housing.

6. The linear displacement device according to claim 1, wherein said first bearing is angularly supported in said housing such that an angle of a central axis of said first bearing relative to a central axis of said lead screw is approximately equal to an angle of a leading flank surface of said helical thread relative to a plane perpendicular to said central axis of said lead screw.

7. The linear displacement device according to claim 6, wherein said second bearing is angularly supported within said housing such that an angle of a central axis of said second bearing is approximately equal to an angle of a following flank surface of said helical thread relative to a plane perpendicular to said central axis of said lead screw.

8. The linear displacement device according to claim 1, wherein said housing is provided with openings for receiving said lead screw therethrough.

9. The linear displacement device according to claim 1, wherein said first and second bearings each include a mounting member connected to said outer race, said mounting member being supported in said housing by a retaining pin mounted to said housing.

10. The linear displacement device according to claim 9, wherein said spring means include first and second coil springs in contact with said first and second bearings, respectively, and seated in said housing for preloading said first and second bearings.

11. A roller nut assembly for use on a lead screw, said roller nut assembly comprising:
   a housing;
   first and second bearings each having an inner race, an outer race and a plurality of balls disposed between said inner and outer races, said inner race supporting a threaded member radially inward thereof, said threaded member having first and second conical surfaces, on of said first and second conical surfaces having a plurality of concentric grooves formed therein, said first and second bearings being supported diagonally within said housing; and
   spring means for preloading said first and second bearings;
   wherein the plurality of concentric grooves of the threaded members of each of said first and second bearings are adapted to engage a helical thread of said lead screw.

12. The roller nut assembly according to claim 11, wherein said spring means includes a leaf spring retained between said first and second bearings.

13. The roller nut assembly according to claim 12, wherein said leaf spring is supported by a plurality of pins mounted to said housing.

14. The roller nut assembly according to claim 11, wherein said housing is provided with retaining surfaces for supporting said first and second bearings.

15. The roller nut assembly according to claim 11, wherein the other of said first and second conical surfaces of said threaded member is adapted to engage a crest of said helical thread of said lead screw.

16. The roller nut assembly according to claim 11, wherein said housing includes a first and second opening for receiving said lead screw therethrough.

17. The roller nut assembly according to claim 11, wherein said first and second bearings each include a mounting member connected to said outer race, said mounting member being supported in said housing by a retaining pin mounted to said housing.

18. The roller nut assembly according to claim 17, wherein said spring means include first and second coil springs in contact with said first and second bearings, respectively, and seated in said housing for preloading said first and second bearings.

* * * * *